Sept. 27, 1927.

A. W. R. SCHULTZ

CREAM CAN AERATOR

Filed April 8, 1927

1,643,822

Inventor
A.W.R. Schultz

Eugene C. Brown
Attorney

Patented Sept. 27, 1927.

1,643,822

UNITED STATES PATENT OFFICE.

ADELBERT W. R. SCHULTZ, OF CLARION, IOWA.

CREAM-CAN AERATOR.

Application filed April 8, 1927. Serial No. 182,161.

This invention relates to milk cans and has special reference to a cream can aerator.

In the construction of milk cans these are usually made in five, eight, and ten gallon sizes with a standard neck opening of six inches and the main body of such standard cans varies from ten inches in diameter to about sixteen inches in diameter. It is common knowledge among dairy farmers that a milk can with a large body and a small neck opening is not a desirable can to use for the purpose of cooling milk although they are designed and are very necessary for shipping milk and cream after it has been cooled. Cream cans are made usually with straight sides to the top leaving the neck opening of exactly the same size as the body of the can which makes a perfect cooling can and my aerator forming the subject of this invention is particularly designed for use in connection with this style of can although the same can also be used on the standard shipping can. Cream cans are usually constructed in from twelve to twenty quart sizes at two quart intervals and have a standard diameter of about nine inches, the capacity being regulated by the height. Furthermore such cans are equipped with a rather long bail for the purpose of carrying the cans or hanging them up by a rope while cooling milk or cream in a water tank. The present invention therefore has been so designed that it will be low enough to fit under the bail and permit space for the hand while carrying the can and the rope for suspending the can in a tank for cooling.

The principal objects of the present invention are to provide a novel and improved form of aerating cap especially adapted for use on the standard size cream cans and which is so constructed and arranged as to fit beneath the bail of such can when raised while at the same time giving a thorough circulation of cooling air and protecting the contents of the can from contamination through dirt or through insects seeking the milk or cream.

With the above and other objects in view the invention will now be specifically described and hereinafter claimed, reference being had to the accompanying drawings wherein:

Figure 4:
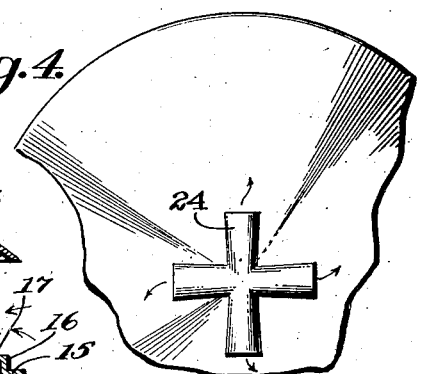
Figure 4 is a partial plan view of the top of such aerator.

The invention as here disclosed is shown both in combination with a cream can 10 having a bail 11 and with a shipping can 12 having a mouth provided neck 13. The invention itself consists of a base portion the body of which is formed by a cylindrical band 14 of such size as to fit over the mouth of the can with which it is to be used. At the upper end of this band 14 there is provided an inturned flange 15 which forms a limit stop to rest on the upper edge of the can and prevent the device from sliding too far down on the can. Projecting upwardly from the inner periphery of the flange 15 is a rib 16 which likewise is provided with an inturned flange 17 so that the periphery of a fine wire screen 18 may engage beneath the flange 17 and the screen be held in position by a retaining ring 19 fitted within the rib 16 and against the under part of the screen periphery thus clamping the same beneath the flange 17 and the ring 19. Extending upward from the flange 17 is a series of posts or supports 20 each having an inwardly bent upper end 21 and on these ends rests a hollow segmental spherical cap 22 secured to the ends 21 by means of rivets 23. The cap 22 is preferably formed of sheet metal and struck up from the sheet metal at the center are the radially disposed ventilating tubes 24 which thus form a species of Greek cross as shown in Figure 4 and have the outlet ends of greater width than the portions at the center. It will be noted that the tubes 24 completely cover the space below from which the metal of the tubes 24 is struck up so that rain, dirt or other objects striking the central portion of the aerator from above cannot reach the screen 18 and thus the passage of fine particles of dirt, microbes, and the like due to objects striking the screen as described is prevented. This is especially true since the periphery of the cap 22 projects well beyond the inner edge of the flange 17.

Figure 1:
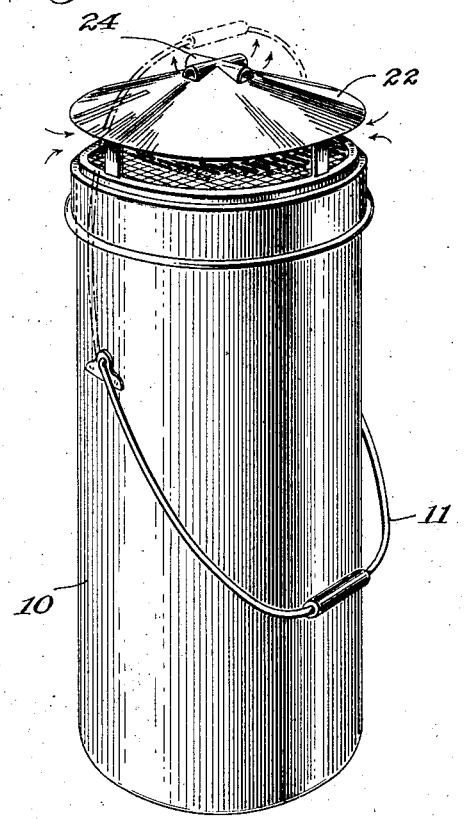
Figure 1 is a perspective view of a cream can equipped with this invention.
Figure 3:
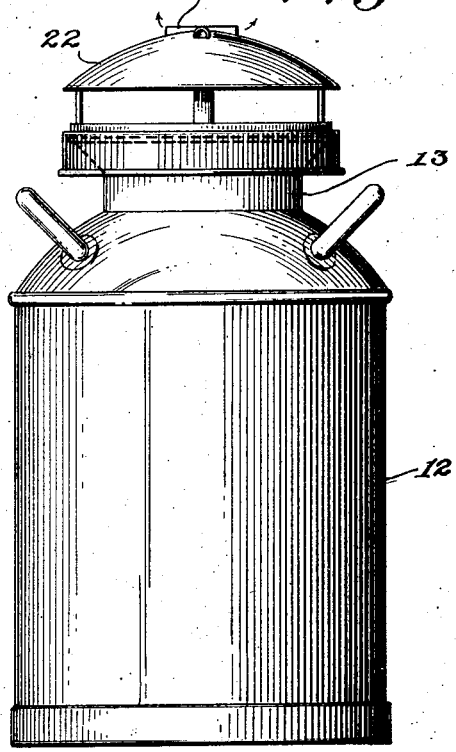
Figure 3 is a side elevation of a can and illustrating the manner of using the invention in connection therewith.
Figure 2:
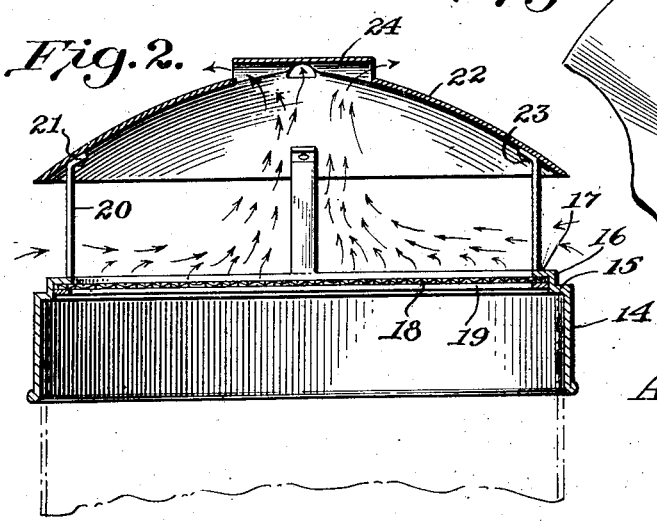
Figure 2 is a vertical section taken diametrically through the aerator.

The device is used by simply placing the same on the mouth of a can and ventilation will follow the direction shown by the arrows best seen in Figure 2.

I have illustrated the preferred construction but it is evident that various changes may be made without departing from my invention. I have shown the screen 18 clamped between a ring 19 and the flange 17, but it may be secured to the flange by soldering. Likewise the support 20 may be fastened to the cover 22 by means of solder instead of rivets.

Having thus described the invention, what is claimed as new, is:

1. In a cream can aerator, an annular band constituting a base for the device and adapted to surround the mouth of a can, a flange projecting inwardly from the top edge of said band to engage the top edge of a can mouth and form a stop for the band, a rib extending upward from the inner periphery of the flange, a second flange extending inwardly from the upper edge of said rib, a foraminous screen fitted within said rib and bearing on the under side of the second flange, a retaining ring fitted within the rib below the screen and bearing against the periphery thereof, legs projecting upwardly from the second flange, a cap member supported on said legs and having its peripheral portion extending outwardly beyond the screen, and ventilator tubes struck up from the top central portion of the cap and having their outer ends wider than their inner ends.

2. In a cream can aerator, an annular band constituting a base for the device and adapted to surround the mouth of a can, a flange projecting inwardly from the top edge of said band to engage the top edge of a can mouth and form a stop for the band, a rib extending upward from the inner periphery of the flange, a second flange extending inwardly from the upper edge of said rib, a foraminous screen fittted within said rib and bearing on the under side of the second flange, a retaining ring fitted within the rib below the screen and bearing against the periphery thereof, legs projecting upwardly from the second flange, a cap member supported on said legs and having its peripheral portion extending outwardly beyond the screen, and ventilation means at the center of said cap.

In testimony whereof I affix my signature.

ADELBERT W. R. SCHULTZ.